United States Patent [19]

Rehn

[11] 4,095,247

[45] June 13, 1978

[54] INTERCHANGEABLE OBJECTIVE FOR CAMERAS

[75] Inventor: Heinz Rehn, Braunschweig, Germany

[73] Assignee: Rollei-Werke Franke & Heidecke, Braunschweig, Germany

[21] Appl. No.: 746,224

[22] Filed: Nov. 30, 1976

[30] Foreign Application Priority Data

Dec. 17, 1975 Germany .............................. 2556771

[51] Int. Cl.² ......................... G03B 7/20; G03B 9/02; G03B 17/00

[52] U.S. Cl. ..................................... 354/286; 354/46; 354/272

[58] Field of Search ................. 354/286, 196, 46, 270, 354/272

[56] References Cited

U.S. PATENT DOCUMENTS 3,782,260 1/1974 Ettischer .............................. 354/286
3,906,529 9/1975 Filipovich .............................. 354/196
3,968,504 7/1976 Konine .................................. 354/286

*Primary Examiner*—Donald A. Griffin
*Attorney, Agent, or Firm*—Ralf H. Siegemund

[57] ABSTRACT

An interchangeable objective for a camera to provide diaphragm control. The objective has an objective tube and a lens mounting axially movable in the tube. A bayonet ring is provided for connecting the objective tube to a camera. Further means are provided for axially moving said objective tube within the bayonet ring to bring said tube into and out of the camera housing and for engaging said tube into the bayonet ring in the position ready for exposure. A diaphragm adjustment ring is rotatably mounted on the bayonet ring, and a diaphragm control ring rotatably disposed on the lens mounting transmits the adjustment of the adjustment ring upon the diaphragm. A coupling element on the adjustment ring is disengageable from and capable of being engaged into the diaphragm control ring.

4 Claims, 3 Drawing Figures

U.S. Patent  June 13, 1978  4,095,247
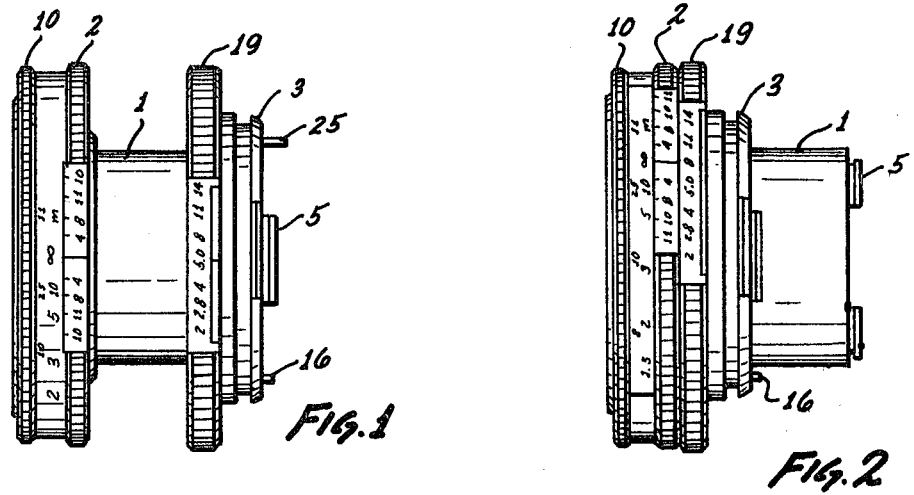
FIG. 1
FIG. 2
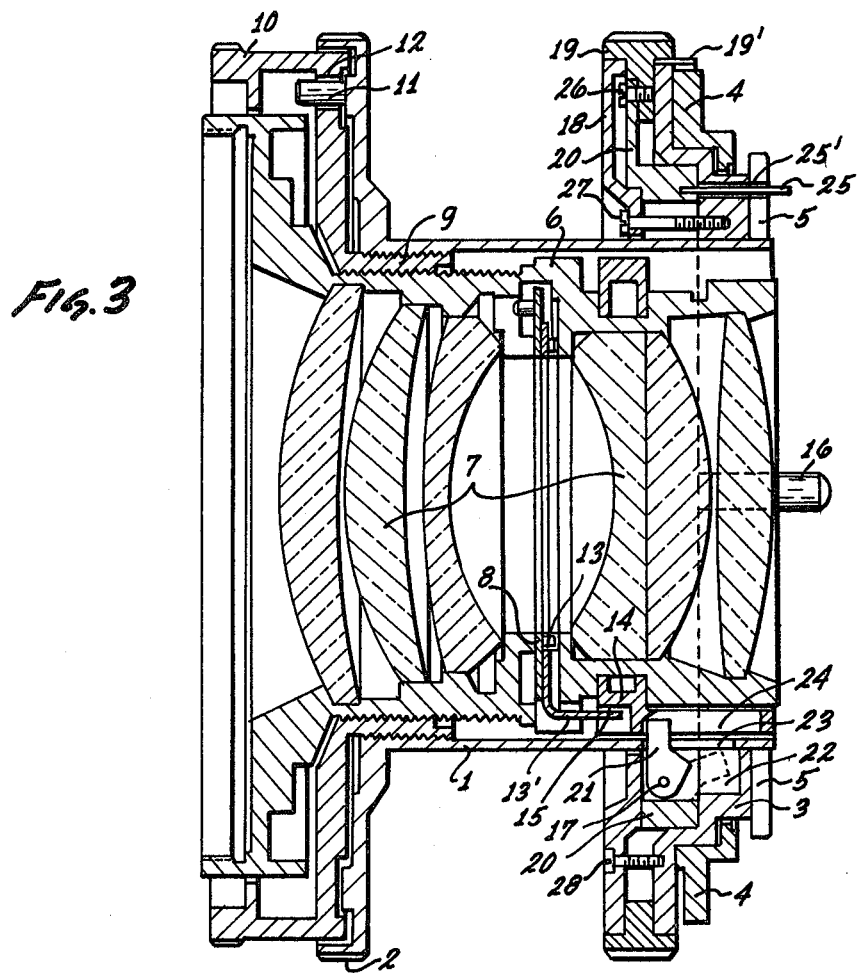
FIG. 3

INTERCHANGEABLE OBJECTIVE FOR CAMERAS

BACKGROUND OF THE INVENTION

The present invention relates to interchangeable objectives for cameras of the type having an objective tube and a lens mounting axially displaceable thereon so that the diaphragm may be adjusted after the objective has been inserted.

Objectives for cameras of the type referred to above are known. These known objectives are focussed by axial displacement of the lens in the objective tube. A knurled ring is arranged at the objective tube for turning, and a worm gear translates the turning motion into an axial displacement of the lens mounting in the objective tube. The objective may be focussed and the diaphragm may be adjusted, e.g. by means of a diaphragm adjustment ring, even when the objective has been removed from the camera. Also, the objective tube carrying the lens with the diaphragm, the knurled ring and the diaphragm adjustment ring may be moved at will within the bayonet ring of the objective regardless of whether the objective is mounted at the camera bayonet mounting or not.

Cameras are known having an exposure metering or exposure control system which require coupling with the objective diaphragm. In this case, it is conventional practice to provide the diaphragm adjustment ring with a plunger extending from the objective in direction to the camera or with a pin which can be swivelled. Such a plunger or pin engage a coupling element in the camera to couple the diaphragm with the exposure metering or control system when the objective is introduced and locked to the camera. The coupling must be coordinated with the introduction or removal of the objective that the coupling elements and plungers or pins clearly cooperate in a form-locking and positive-drive position.

SUMMARY OF THE INVENTION

It is accordingly an object of the present invention to provide a reliable connection or coupling of an interchangeable objective to a camera.

It is another object of the present invention to improve interchangeable objectives having a tube for holding the objective proper, a diaphragm and a bayonet connection.

It is a particular object of the present invention to improve the construction of interchangeable objectives not only having a lens which moves axially for focusing - inclusively its diaphragm - but being also displaceable with its objective tube over a larger distance without requiring long and complicated transmission devices or rods.

In accordance with the present invention, a diaphragm adjustment ring is rotatably mounted on the bayonet ring of the objective. The adjustment ring carries a coupling element which may be disengaged from or engaged with a diaphragm control ring being rotatably mounted on a lens mounting of the objective. The diaphragm control ring adjusts the diaphragm. Hence, the diaphragm adjustment ring is spatially fixedly mounted with respect to the objective bayonet ring. Therefore, the known simple coupling with the coupling portions of the camera for transmitting or controlling the diaphragm may be retained.

Preferably, the coupling element is comprised of a lever that turns about a tangential axis at the diaphragm adjustment ring. The lever may be selectively turned into the path of an axial projection of the diaphragm control ring or be moved into a cutout of the objective bayonet ring.

Further in accordance with the invention, an opening may be provided at the objective tube for this lever which is so limited in its axial direction that it permits passage of the lever only in the exposure position of the objective tube. When the objective tube is introduced it displaces the lever outwardly and hence locks the diaphragm adjustment ring at the objective bayonet ring. Accordingly, the diaphragm adjustment ring will function for adjustment of the diaphragm only when the tube has been pulled out. Vice versa, removal of the objective from the camera is possible only when the objective tube has been pushed in. Furthermore, the diaphragm adjustment ring has a double function in that it serves on the one hand as diaphragm adjustment ring proper, and on the other hand as actuating ring or handle for connecting the objective to the camera or removing it therefrom.

According to a further extension of the invention, the cutout of the objective bayonet ring is correlated to a predetermined position of the diaphragm adjustment ring, preferably corresponding to the largest opening of the objective diaphragm in such a manner that the lever may drop into the cutout only in this position. Thus, the diaphragm adjustment ring and diaphragm control ring may disengage only then, and the coupling of diaphragm adjustment ring with the bayonet ring and the introduction of the objective tube into the camera housing is likewise possible only in this position.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings, in which:

FIG. 1 is a side elevational view of the interchangeable objective of the invention, the objective tube being pulled out;

FIG. 2 is a side elevational view corresponding to that of FIG. 1 with the objective tube pushed in; and FIG. 3 is a longitudinal section of the entire objective and a camera bayonet mounting corresponding to the position of FIG. 1.

Referring now to the drawings, there is illustrated an objective tube 1 having a frontal flange with a knurled ring 2 which serves as a handle. Tube 1 is axially slidably mounted in an objective bayonet ring 3. The objective bayonet ring 3 can be inserted into bayonet mounting 4 shown in FIG. 3, mounting 4 pertaining to the camera housing. The tube 1 carries also a bayonet ring 5 which faces the camera and serves as an axial stop. When the tube is in the pulled out position and ready for exposure, bayonet ring 5 can be inserted and locked into the objective bayonet ring 3. The objective tube 1 is locked in the position ready for exposure as shown in FIG. 3.

A lens mounting 6 with a lens system 7 and a diaphragm of iris 8 is provided in tube 1. A worm gear that is disposed in a sleeve 9 having inner and outer threads guides the lens mount. The adjustment knurled ring 10 of the sleeve 9 is turned to move the lens 7 in an axial direction for purposes of focussing. Turning of ring 10 or of the sleeve 9 is limited to an adjustment range by a pin 11 mounted on the knurled ring 2 of the tube 1 and by an arcuate slot 12 of the adjustment knurled ring 10.

The diaphragm 8 is arranged within the lens system in a known manner. The blade or lamella drive ring 13 is adjusted by a follower lever 13' being connected thereto. Lever 13' is controlled by a diaphragm control ring 14 by means of its radial cam track 15. The diaphragm control ring 14 is rotatably mounted on the lens mounting 6. A diaphragm adjustment ring 20 is, in turn, rotatably mounted between the objective bayonet ring 3 and a bayonet ring housing 18, the latter being connected with the objective bayonet ring 3 by screws 27 and 28.

Ring 20 is connected to knurled ring 19 by a screw 26. This knurled ring 19 will be gripped by the user for manipulating ring 20. Ring 19 covers partially the diaphragm scale 19' disposed at the upper portion of the objective bayonet ring 3. A lever 21 is mounted at the diaphragm adjustment ring 20 for turning about a tangential axis 17. The objective bayonet ring 3 is provided with an axial cutout 22 into which the lever 21 may be pushed as shown in dotted lines at 21'. This requires, of course, that lever 21 and cutout 22 are in alignment with each other. On the other hand, an opening 23 is provided in the tube 1 and is traversed by the lever 21, whereby the lever 21 projects into the interior of the tube. Insertion of lever 21 into cutout 22 occurs when tube 1 is pushed into the camera. As lever 21 is inserted in cutout 22, the diaphragm adjustment ring 20, or respectively the knurled ring 19, is locked to the objective bayonet ring 3. This opening 23 extends over that portion of the circumference of the tube which corresponds to the region of adjustment of the diaphragm. The axial length of the opening 23 is selected, at least in one place, so that lever 21 can only pass through this opening when the tube has been pulled out or extended.

The cutout 22 of the objective bayonet ring 3 and the position of the tube opening 23 having the greates axial length for the insertion of the lever 21, are arranged so that they permit the introduction of the lever only for one very particular position of the diaphragm adjustment ring corresponding to a particular predetermined position of the diaphragm; this corresponds preferably to the largest adjustable diaphragm opening.

The diaphragm control ring 14 carries an axial extension 24 which, for example, is constructed to have the configuration of a fork into which the lever 21 may move through the opening 23 of the tube 1 due to the action of a spring not illustrated. The diaphragm adjustment ring 20 and the diaphragm control ring 14 are coupled in this manner. The axial length of the extension 24 depends upon the greatest axial movement of the lens mounting 6 during focussing.

Since the extension 24 is constructed as a fork, lever 21 provides a rigid coupling between the diaphragm 8 and the diaphragm adjustment ring 20 or its knurled ring 19. By means of a tappet 25 which extends rearwardly from the diaphragm adjustment ring 20 through the arcuate slot 25', a rigid connection is provided to the exposure and diaphragm control at the camera in the conventional manner.

For cameras having a measurement with open diaphragm and wherein the diaphragm is closed only and moved to the correct aperture value when the shutter is released, the extension 24 is preferably not arranged as a fork but should be provided as a simple stop. As the shutter is released in this case the diaphragm 8 is closed in the known manner by means of a diaphragm plunger 16 and against the action of a spring or under the action of a spring; that is the diaphragm control ring 14 is turned until closure movement of the diaphragm is stopped by the stop 24 intercepting lever 21. In this known camera the diaphragm is again fully opened after exposure, independently of the diaphragm value previously adjusted on the scale 19'. In this case, the most favorable solution for the position of the cutout 22 for the lever 21 for the adjustment of the diaphragm adjustment ring 19 corresponds to the largest opening of the diaphragm at scale 19'.

The position of the objective as illustrated in FIG. 3 shows the objective attached to the camera and ready for exposure; focussing is accomplished by turning the knurled ring 10, while the diaphragm is adjusted by turning the ring 19. After adjustment of the diaphragm to the above mentioned, predetermined aperture value, the tube 1 may be disengaged by means of the handle 2 at the bayonet ring 3 and may be pushed into the camera housing. While the tube is pushed in, the lever 21 is displaced into the cutout 22 of the bayonet ring 3. Thus, the diaphragm adjustment ring 20 is now locked to the objective bayonet ring 3 so that the objective can be disengaged by means of the knurled handle 19 from the camera bayonet ring 4 and removed from the camera.

In the opposite case, when the objective has been removed from the camera or the tube had been pushed in the camera housing, adjustment of the diaphragm is not possible. The diaphragm 8 or the diaphragm blade drive 13 is disengaged from the diaphragm adjustment ring when the objective tube is pushed in. However, the diaphragm retains this position without the necessity of an additional locking device because an adjustment of the diaphragm is not possible without engaging the interior of the objective. The only possibility is to manually operate the plunger 16. This, however, will not result in any damage because the plunger is returned to its rest position by the action of a spring.

The invention is not limited to the embodiments described above but all changes and modifications thereof not constituting departures from the spirit and scope of the invention are intended to be included.

I claim:

1. Interchangeable objective for a camera to provide diaphragm control, said objective comprising:
    (a) an objective tube; a lens mounting being disposed in and axially movable in said objective tube;
    (b) a lens or lens system and a diaphragm mounted in said lens mounting;
    (c) a bayonet ring for connecting said objective tube to the camera, said objective tube being axially movably disposed in the bayonet ring for purposes of inserting the tube into the camera and pulling the tube out of the camera;
    (d) releasable means for engaging said objective tube with the bayonet ring in a position ready for exposure after the tube has been pulled out of the camera and for disengaging the tube from the ring for pushing the tube into the ring and the camera;
    (e) a diaphragm adjustment ring being rotatably mounted on said bayonet ring;
    (f) a diaphragm control ring for transmitting the adjustment of said adjustment ring upon the diaphragm, said control ring being rotatably disposed on said lens mounting; and (g) a coupling element being movably disposed on said diaphragm adjustment ring and capable of being engaged with and disengaged from the diaphragm control ring, respectively, when the objective tube has a pulled out and an inserted position.

2. Objective as defined in claim 1, wherein said coupling element includes a lever for turning about a tangential axis on said diaphragm adjustment ring, a cutout on said bayonet ring, an axial projection on said diaphragm control ring, said lever being capable for selective turning into the path of said axial projection of said control ring and into said cutout of said bayonet ring.

3. Objective as defined in claim 2 wherein an opening is provided in said objective tube for the passage of said lever, said opening being limited in an axial direction in such a manner that the passage of said lever is only permitted when said objective tube is in a position ready for taking exposures, and said opening displacing said lever during the insertion of said objective tube into the camera outwardly into said cutout of said bayonet ring.

4. Objective as defined in claim 2 wherein said cutout of said bayonet ring is coordinated with a predetermined position of said diaphragm adjustment ring so that it permits the passage of said lever and therefore the insertion of said objective tube into the camera only in said predetermined position.

* * * * *